United States Patent [19]
Yesel et al.

[11] Patent Number: 5,636,120
[45] Date of Patent: Jun. 3, 1997

[54] DIRECT DRIVE AUTOSHIFT TRANSMISSION CONTROL

[75] Inventors: Leon P. Yesel, East Peoria; John P. Kitzerow, Metamora, both of Ill.

[73] Assignee: Caterpillar Inc., Peoria, Ill.

[21] Appl. No.: 696,019

[22] Filed: Aug. 9, 1996

Related U.S. Application Data

[63] Continuation of Ser. No. 276,183, Jul. 15, 1994, abandoned.
[51] Int. Cl.⁶ .................................................. B60K 41/06
[52] U.S. Cl. ........................ 364/424.08; 74/335; 477/81
[58] Field of Search .......................... 364/424.1; 74/335, 74/336 R, 473 R; 477/81, 34, 115, 165

[56] References Cited

U.S. PATENT DOCUMENTS

| | | | |
|---|---|---|---|
| 4,414,863 | 11/1983 | Heino | 364/424.1 X |
| 4,425,620 | 1/1984 | Batcheller et al. | 364/424.1 |
| 4,631,679 | 12/1986 | Klatt | 364/424.1 |
| 5,007,299 | 4/1991 | Bulgrien | 74/335 |
| 5,050,079 | 9/1991 | Steeby | 364/424.1 |
| 5,056,376 | 10/1991 | Moroto et al. | 74/335 |
| 5,089,962 | 2/1992 | Steeby | 364/424.1 |
| 5,393,275 | 2/1995 | Okada et al. | 477/81 |
| 5,401,223 | 3/1995 | White et al. | 364/424.1 X |
| 5,415,056 | 5/1995 | Tabata et al. | 74/335 |

*Primary Examiner*—Collin W. Park
*Attorney, Agent, or Firm*—John L. James; Steven G. Kibby

[57] ABSTRACT

An electronic autoshift control is provided for a transmission and engine to help reduce demands on the operator. Part of the autoshift feature is an auto/manual switch which is a two-position rocker switch controlled by the operator. The switch determines whether the transmission is being operated in the manual or the automatic mode. In the manual mode, all shifting is performed by the operator by moving the shift lever. Once in the automatic mode, the transmission controller takes over with the autoshift feature. When switched to the automatic mode, an auto/manual lamp is lit indicating the transmission's automatic mode of operation. The rocker switch also functions as a hold switch. If traction conditions are poor and the operator wants to stay in the present gear, the rocker switch can be toggled to the manual mode. This locks the transmission in its present gear and causes the auto/manual lamp to flash if the shift lever selection and the present transmission selection do not coincide. Once the operator is out of the poor conditions, the switch can be returned to auto thus resuming the autoshift functions.

12 Claims, 7 Drawing Sheets

DIRECT DRIVE AUTOSHIFT TRANSMISSION CONTROL

This is a file wrapper continuation of application Ser. No. 08/276,183, filed Jul. 15, 1994, now abandoned.

TECHNICAL FIELD

The present invention pertains to a machine having an electronically controlled transmission and engine, and, more particularly, to an apparatus and method for controlling automatic shifting of the transmission.

BACKGROUND OF THE INVENTION

In a machine, such as a motor grader, for example, an engine and a transmission work together to propel the machine and operate implements. A motor grader may have over a dozen hydraulic implements under an operator's control which makes the operators job one that makes full use of the hands. An automatic transmission reduces the demands on the operator, but an automatic transmission alone may not provide significant relief where the operator must frequently change gears or speeds to accomplish a particular task. Also, an automatic transmission may be less efficient. For some tasks, the operator desires to maintain manual transmission control. Accordingly, it will be appreciated that it will be highly desirable to have an electronically controlled transmission which automatically shifts gears, yet which, by simple operator control, switches from an automatic mode to a manual mode.

DISCLOSURE OF THE INVENTION

The present invention is directed to overcoming the problem set forth above. According to one aspect of the present invention, a method is provided for controlling shifting of an electronically controlled transmission and engine. The transmission has an output shaft and is shiftable by an electronic shift control between forward and reverse gears to rotate the output shaft in forward and reverse directions and a neutral gear without shaft rotation. The transmission has an operator controlled shift lever for requesting an gear from the forward, neutral and reverse gears, and operates in a present gear from among the forward, reverse and neutral gears.

The method includes determining upshift and downshift shift points and storing the shift points in a memory portion of the electronic shift control; monitoring transmission output shaft speed; operating the shift lever and requesting a gear from the forward, reverse and neutral gears; and determining whether auto/manual switch is in the auto or manual position. The method also includes shifting the transmission to the requested gear when the transmission control is operating in a manual mode; determining whether the lever position coincides with the present gear; setting the transmission control to the manual mode when the lever position coincides with the present gear and shifting the transmission to the requested gear; and holding the transmission in the present gear when the lever position does not coincide with the present gear.

According to another aspect of the invention, an electronic autoshift control includes electronic shift control means operable in a manual mode and an automatic mode for shifting the transmission between the forward, reverse and neutral gears; an operator actuated gear shift lever operable to request a gear from the forward, reverse and neutral gears; and an operator actuated rocker switch operable between a manual position and an automatic position, at the manual position the switch enables the gear shift member giving the operator manual shifting control if the present gear and requested gear are the same and locking in the present gear if the present gear and requested gear are different when the switch is moved from the automatic position to the manual position, at the automatic position the electronic shift control means controls shifting with the operator actuating the gear shift member to limit maximum obtainable gear to the requested gear.

These and other aspects, objects, features and advantages of the present invention will be more clearly understood and appreciated from a review of the following detailed description of the preferred embodiments and appended claims, and by reference to the accompanying drawings.

BEST MODE FOR CARRYING OUT THE INVENTION

Figure 1:
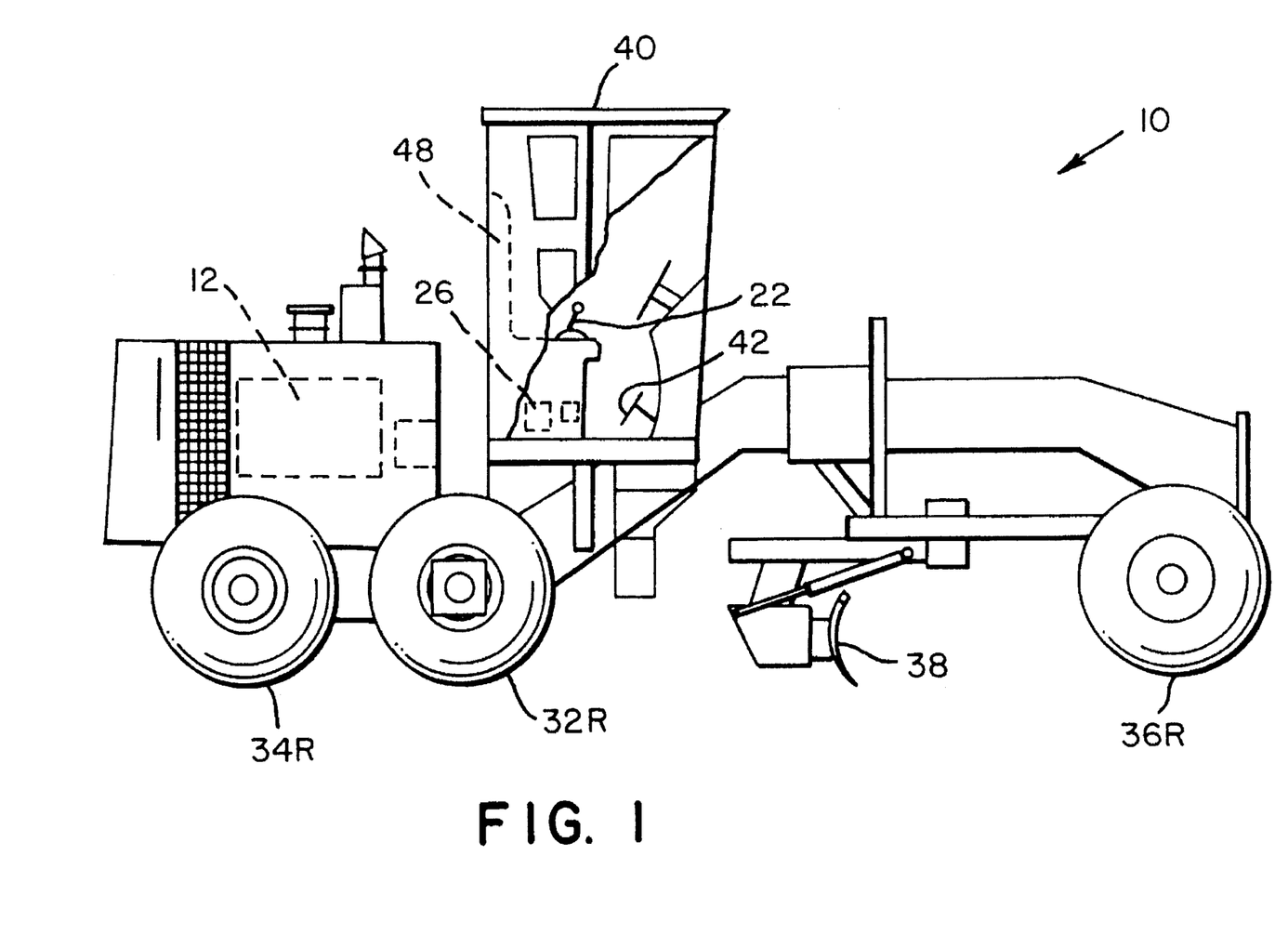
FIG. 1 is a diagrammatic side elevational view of a preferred embodiment of a motor grader constructed for operation in accordance with the present invention.
Figure 2:
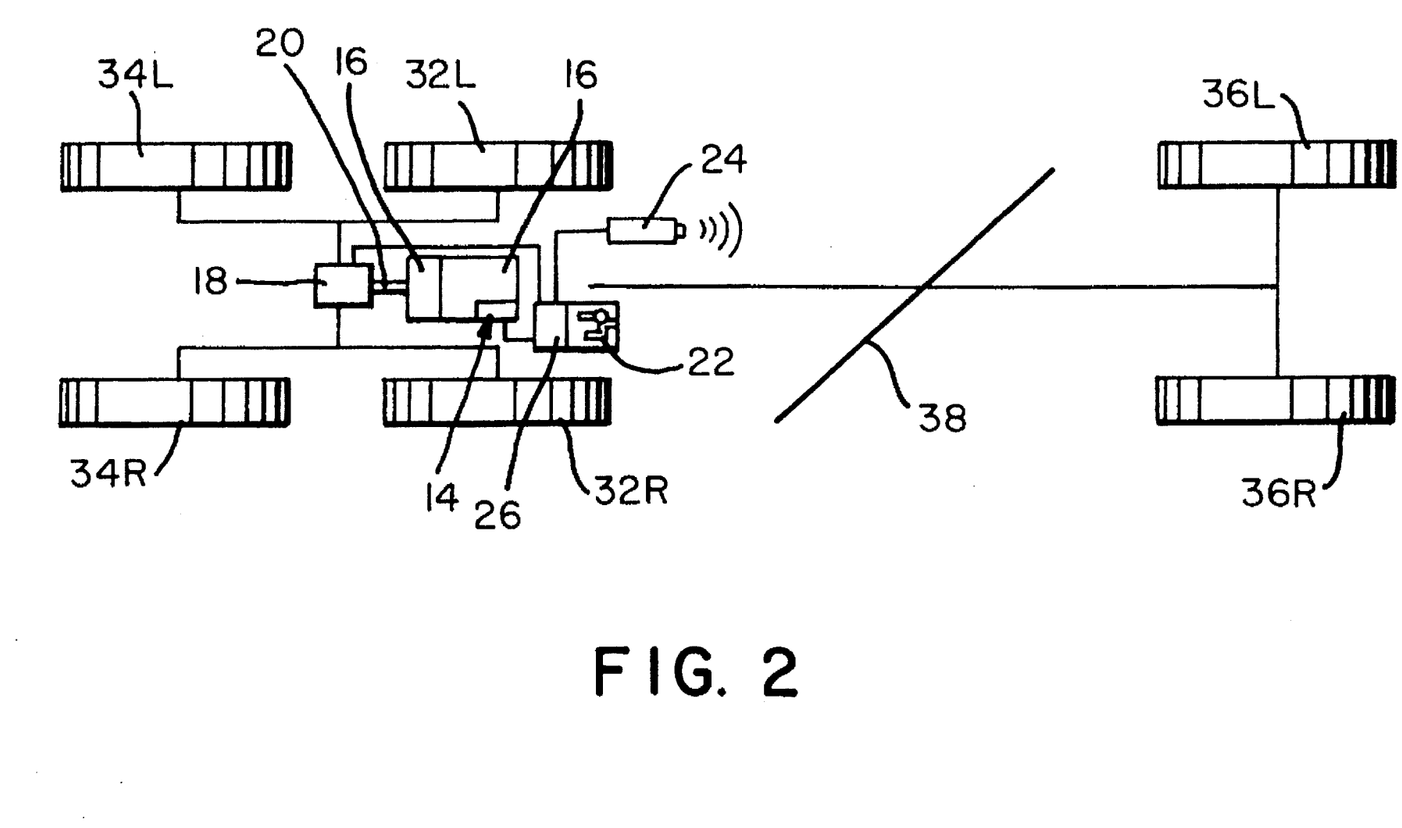
FIG. 2 is a diagrammatic plan view of the motor grader of FIG. 1.
Figure 3:
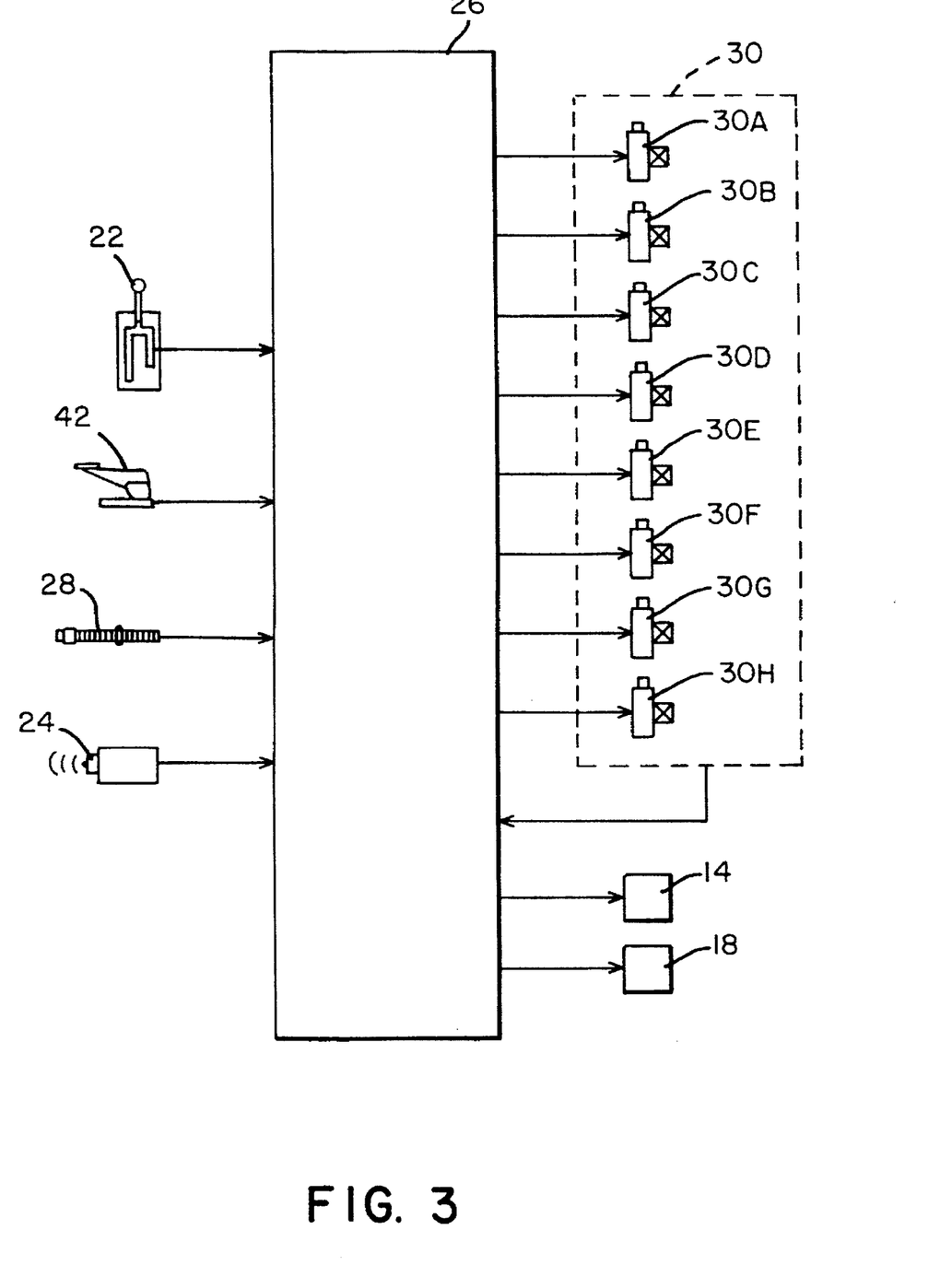
FIG. 3 is a schematic block diagram of the transmission controller of the motor grader of FIG. 1.
Figure 4A:
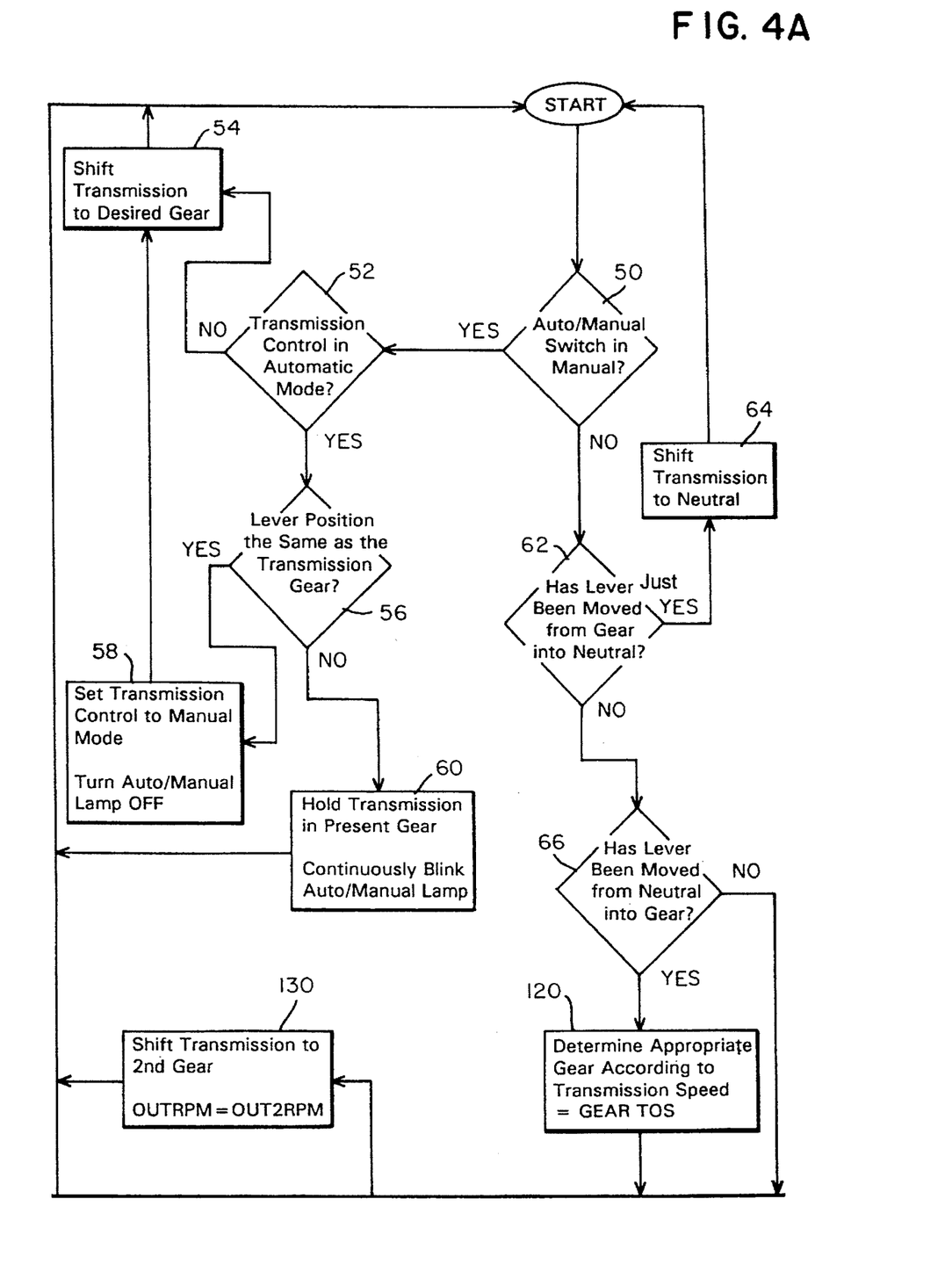
FIGS. 4A–4D are a flow chart depicting a method for automatically shifting the transmission.
Figure 4B:
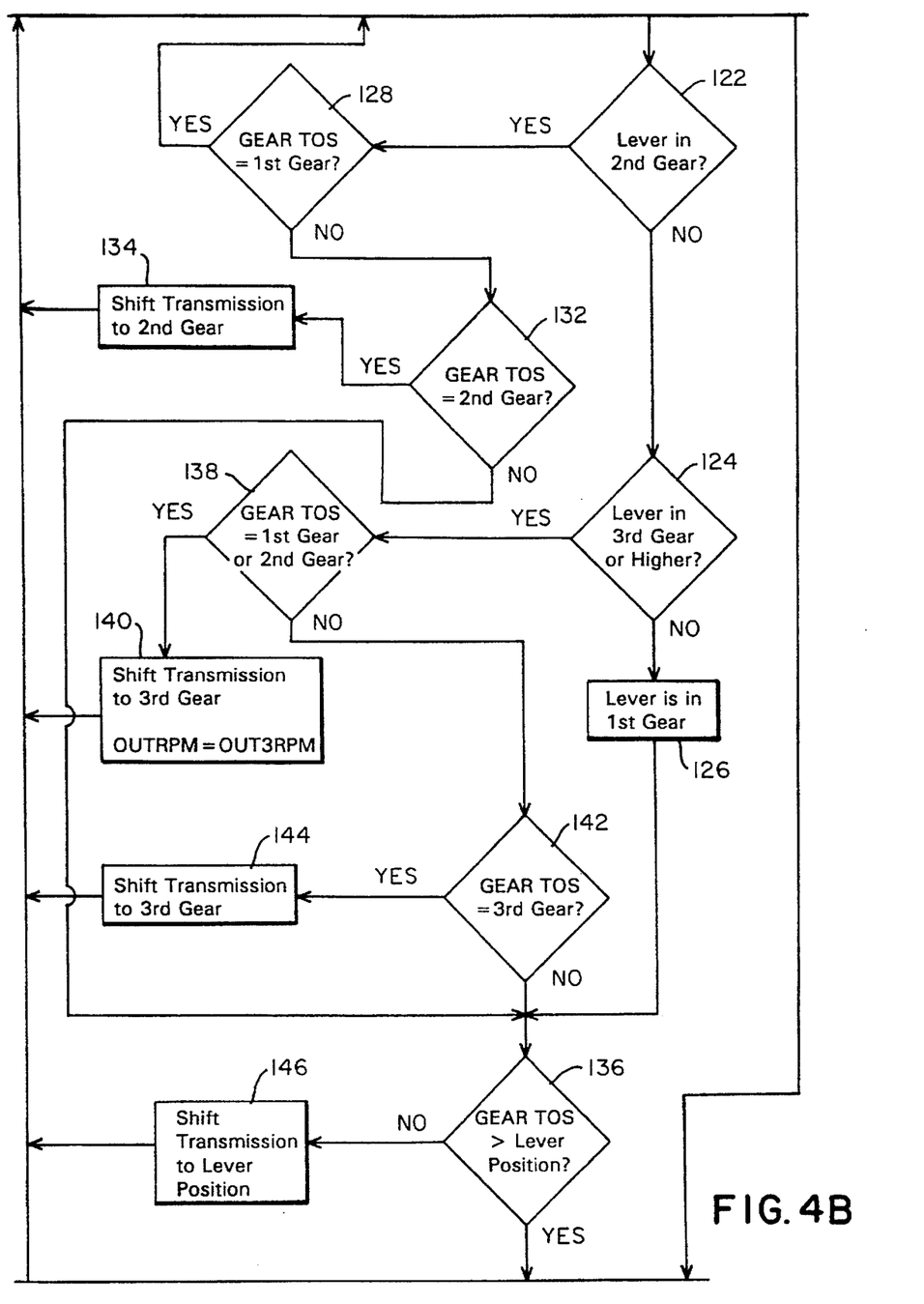
Figure 4C:
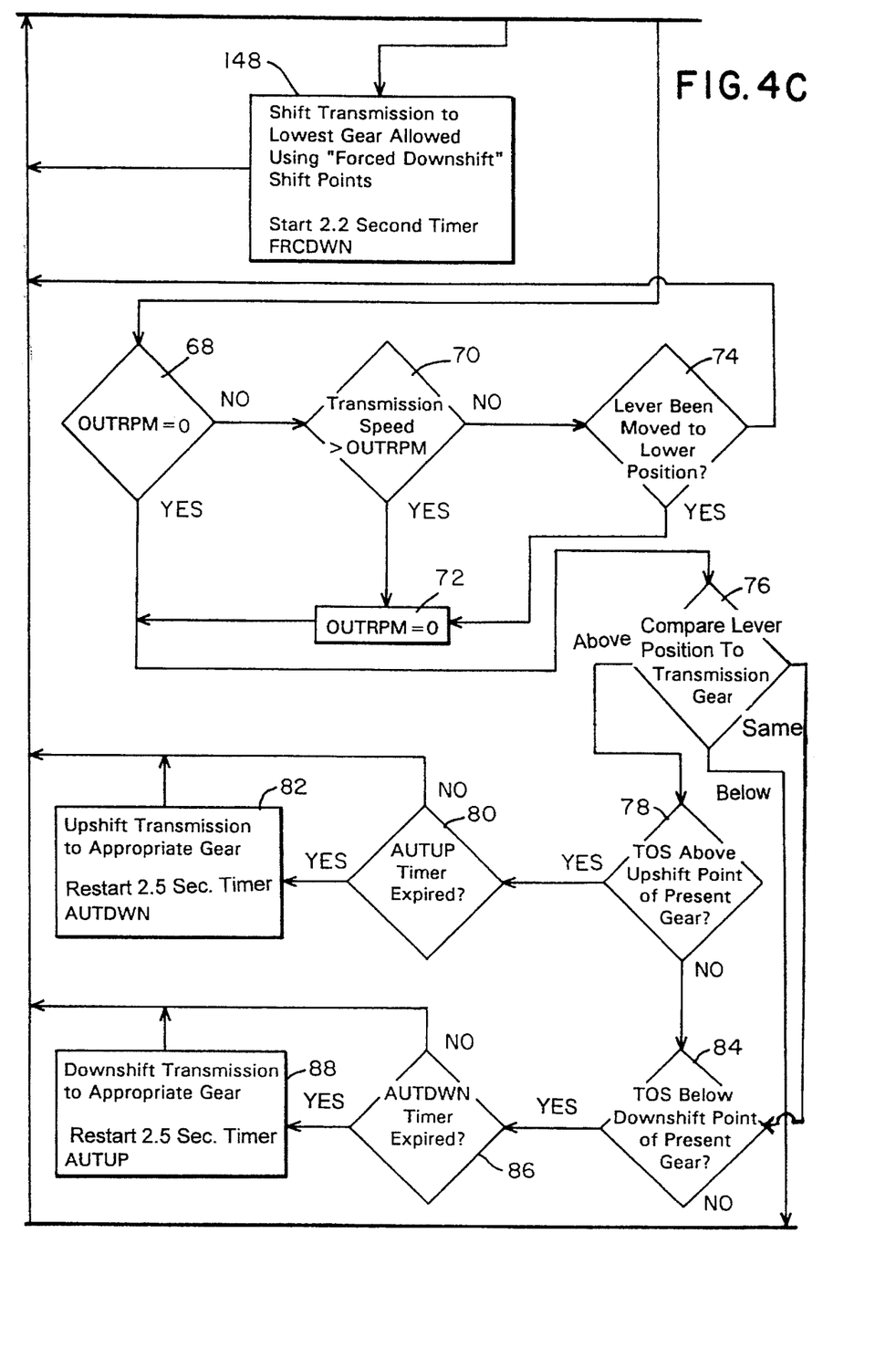
Figure 4D:
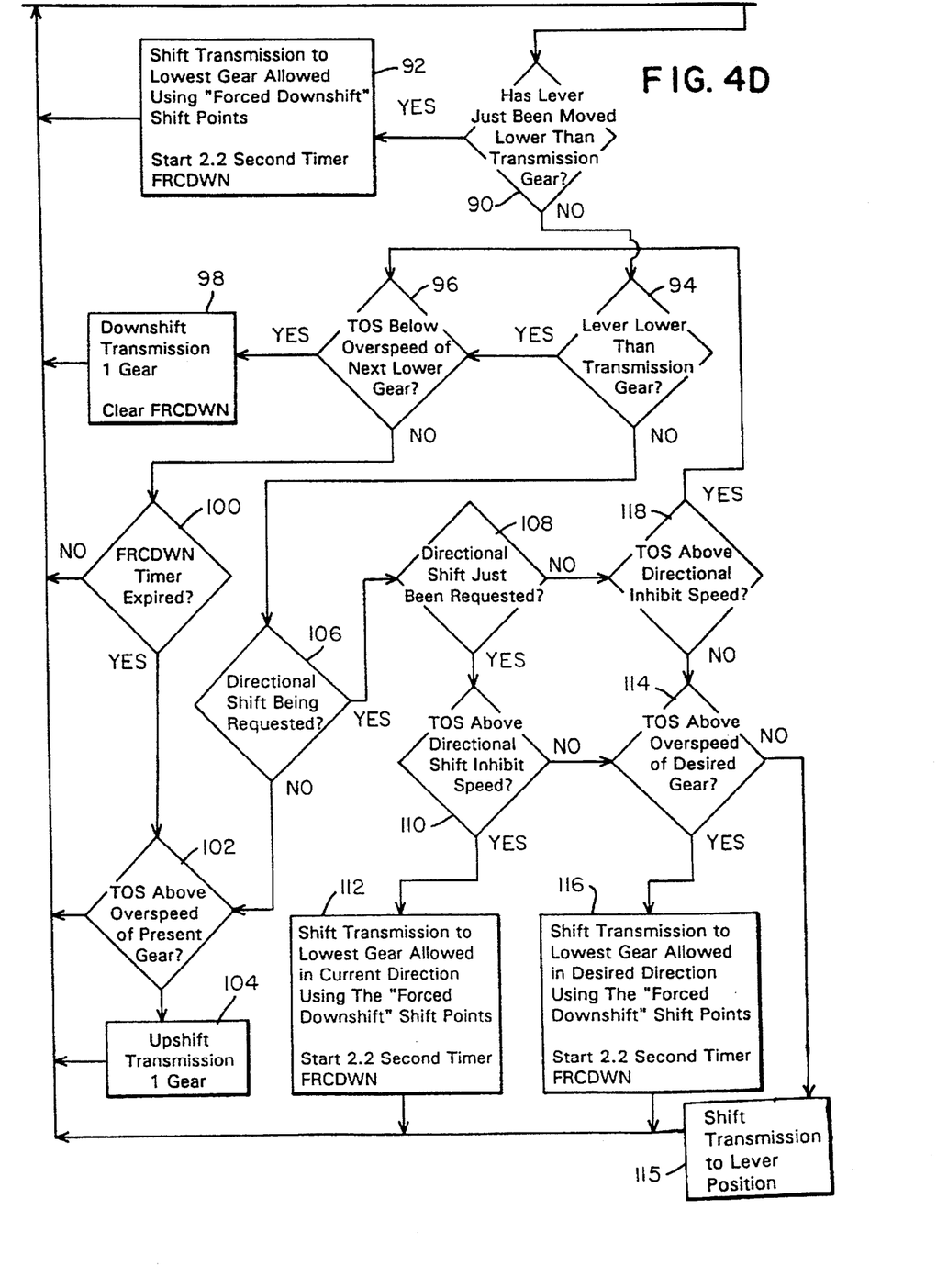

Referring to FIGS. 1–3, a machine such as a motor grader 10, has an engine 12 with an engine throttle control 14 for racking the engine and controlling engine speed. A transmission 16 is coupled to the engine 12 and coupled to a differential gearing system 18 by a transmission output shaft 20. The transmission output may be measured in terms of the speed of rotation of its output shaft in rpm. A shift lever 22 is associated with the transmission for shifting the transmission between its various gears which may include a neutral gear as well as 8 forward and 6 reverse gears.

The transmission shift control lever 22 is a multicontact switch that sends position information to a controller 26 to indicate a desired gear for the transmission 16. When the transmission speed, as indicated by a transmission output shaft sensor 28, and the engine speed permit a shift to the desired gear, the controller 26 operates appropriate ones of the transmission solenoids 30. Eight transmission solenoids are illustrated and labeled SA through SH. As is known in the art, the transmission solenoids 30 operate the transmission clutches and thereby determine the actual gear of the transmission.

The differential gear drives the rear wheels 32L, 32R, 34L, 34R, with the left wheels 32L, 34L connected in tandem and the right wheels 32R, 34R also connected in tandem. A pair of steering wheels 36L, 36R are located at the front of the motor grader. The blade 38 of the motor grader is located between the front and rear wheels.

Various operator controls are located in an operator's compartment 40. These controls include the transmission shift lever 22 and inching pedal 42, an auto/manual switch 44 and an auto/manual lamp 46. The controller 26 may be conveniently located under the operator's seat 48. The controller 26 is a microprocessor based electronic module that receives information from the shift lever 22 the auto/manual switch 44, the inching pedal 42, the transmission output speed sensor 28 and the radar unit 24 and uses that information to operate the auto/manual lamp 46 to indicate whether the mode of operation is manual mode or automatic mode. The controller 26 actuates appropriate ones of the solenoids 30A–30G for shifting the transmission 16 to the desired gear.

FIGS. 4A–4D are a flow chart depicting a method for automatically shifting a direct drive motor grader. At the start of the method, the controller 26 decides at decision block 50 whether the transmission is to be operated in a manual mode or an automatic mode by noting the position of the auto/manual switch 44. When the auto/manual switch is in the manual position, the controller determines whether the transmission is presently in the automatic mode at decision block 52. If not, then, at block 54, the transmission is shifted to the desired gear and the process restarts. If the transmission controller is presently in the automatic mode, then, at decision block 56, the controller determines whether the shift lever position is the same as the present transmission gear. If the shift lever position is the same as the transmission gear, then, at block 58, the transmission controller is set to the manual mode and the auto/manual lamp 46 is turned off. On the other hand, if the shift lever position is not the same as the present transmission gear, then, at block 60, the transmission is held in its present gear and the auto/manual lamp 46 continuously blinks.

If the auto/manual switch is not in a manual position at decision block 50, the controller knows that the transmission is to be operated in the automatic mode and determines at block 62 whether the shift lever has moved from gear into neutral. If so, at block 64 the transmission is shifted to neutral and the process restarts. If not, then, at decision block 66, the controller determines whether the lever has just been moved from neutral into gear.

When the lever has not just been moved from neutral into gear, then at decision block 68 it is determined whether the minimum desired output speed variable for the present gear of the transmission is cleared, i.e., does OUTRPM=0? If the answer is no, then, at decision block 70, it is determined whether the transmission output speed TOS is greater than OUTRPM. If so, then OUTRPM is set to zero (cleared) at block 72. If not, then at block 74 it is determined whether the shift lever has been moved to a lower position. If so, OUTRPM is set to zero cleared at block 72. If not, the process restarts. After determining that OUTRPM is set to zero at block 72, the controller next compares the shift lever position to the transmission gear at decision block 76. When the shift lever position is not the same as or lower than the transmission gear, then, at block 78, it is determined whether the transmission output speed is above the upshift shift point of the present gear. If so, then at block 78, it is determined whether an auto upshift timer, AUTUP, has expired. If not, the process restarts. If so, then at block 82 the transmission is upshifted to the appropriate gear, a 2.5 second auto downshift, AUTDWN, timer is restarted and the process restarts. If, at block 78, the transmission output speed is not above the upshift point of the present gear or the shift lever position is the same as the present transmission gear, then, at block 84, it is determined whether the transmission output speed is below the downshift shift point of the present gear. If so, then at block 86, it is determined whether the AUTDWN timer has expired. If not, the process restarts. If so, then at block 88, the transmission is downshifted to the appropriate gear, a 2.5 second timer, AUTUP, is restarted and the process restarts.

The next step in the method is determining at decision block 90 whether the transmission shift lever 22 has just been moved to request a gear lower than the actual gear of the transmission 16 as indicated by the solenoids 30. By just been moved it is meant moved since the last time the query was made. If the shift lever has just been moved lower than the transmission gear, then at block 92 the controller shifts the transmission to the lowest gear allowed using the forced downshift shift points. As is known in the art, transmission shift points for a machine are set using a number of factors such as engine and transmission speeds and torques and ground speed. These shift points and speed parameters are stored in a memory portion of the controller. When the controller shifts the transmission to the lowest gear allowed using the forced downshift shift points, a 2.2 second timer, FRCDWN is started, and the process continues by returning to the first step.

At decision block 90 on the next pass, the query is made whether the shift lever has just been moved lower than the transmission gear. Because this is the second inquiry since moving the lever and the FRCDWN timer is running, the answer is no. The next query at decision block 94 is to determine whether the shift lever is lower than the transmission gear; that is, has a gear been requested that is lower than the present gear. When a lower gear has been requested the next inquiry at decision block 96 is whether the transmission is below overspeed for the next lower transmission gear. If the answer is yes then at block 98 the controller downshifts the transmission by one gear, clears the FRCDWN timer and the process restarts.

If, at decision block 96, the transmission is not below overspeed of the next lower gear, then the controller determines whether the FRCDWN timer has expired at decision block 100. If the FRCDWN timer has not expired the process restarts. If, on the other hand, the FRCDWN timer has expired, the controller then inquires at block 102 whether the transmission is above overspeed of the present gear. If the transmission is not above overspeed of the present gear the process restarts. When the transmission is above overspeed of the present gear then at block 104 the controller upshifts the transmission by one gear and the process repeats.

The process continues to decision block 106 when the shift lever has not just been moved at block 90 and is not lower than the present transmission gear at block 94. At block 106, a query is made whether a directional shift is being requested. When a directional shift is not being requested, the method proceeds to decision block 102 as described above. When a directional shift is being requested, the controller determines at block 108 whether the directional shift has just been requested. If the directional shift has just been requested, then at decision block 110, the controller determines whether the transmission speed is above the directional shift inhibit speed. If so, then at block 112, the controller shifts the transmission to the lowest gear allowed in the current direction using the forced downshift shift points and starts the 2.2 second timer, FRCDWN. The process then repeats by returning to decision block 90. At block 110, if the transmission speed is not above the directional shift inhibit speed, then at decision block 114, it is determined whether the transmission speed is above overspeed of the requested gear. When the answer is yes, then at block 116, the controller shifts the transmission to the lowest gear allowed in the desired direction using the forced downshift shift points and starts the 2.2 second timer, FRCDWN.

At decision block 108, when the directional shift has not just been requested, then at decision block 118 the inquiry is made whether the transmission speed is above the directional shift inhibit speed. If the answer is no, the controller proceeds to block 114 to query whether the transmission speed is above overspeed of the desired gear as described previously. On the other hand, when the transmission speed is above the directional shift inhibit speed at block 118, then the process continues to decision block 96 as described above.

A no answer at decision block 114 means that the transmission will shift to the requested gear and return to start.

Returning now to decision block 66, when it is determined that the lever has been moved from neutral into gear, then at block 120, the appropriate gear according to the transmission speed is determined and labeled GEARTOS for identification. Next, at decision block 122, it is determined whether the shift lever is in the second gear position. If not, it is determined at block 124 whether the shift lever is in third gear or higher. If not, the controller determines at block 126 that the shift lever is in the first gear position.

Returning to decision block 122, when the shift lever is in the second gear position, then at block 128, it is determined whether GEARTOS is the equivalent of first gear; that is, is the appropriate gear according to the transmission speed first gear. If so, then at block 130, the transmission is shifted to second gear and the transmission output speed control variable OUTRPM is set to second gear output speed OUTRPM2 and the process restarts. If the appropriate gear according to transmission speed is not first gear, then at decision block 132, it is decided whether the appropriate gear according to the transmission speed is second gear. If so, then at block 134 the transmission is shifted to second gear. If not, then the process continues to decision block 136. The process also continues to decision block 136 after deciding that the shift lever is in first gear at block 126.

Returning now to decision block 124. When it is determined that the shift lever is in third gear or higher, then at decision block 138, it is determined whether the appropriate gear according to the transmission speed is one of first or second gear. If it is first or second gear, then at block 140 the transmission shifts to third gear and the transmission output speed control variable OUTRPM is set to output speed for third gear OUTRPM3. If the appropriate gear according to transmission speed is not first or second gear, then at block 142, it is determined whether the appropriate gear according to transmission speed is third gear. If so, then at block 144, the transmission is shifted to third gear. If not, then the method proceeds to decision block 136.

At decision block 136, it is determined whether the appropriate gear according to the transmission speed is greater than the shift lever position indicates. If the answer is no, then at block 146, the transmission is shifted to the lever position and the process repeats. If the appropriate gear according to the transmission speed is greater than the shift lever position, then at block 148, the transmission is shifted to the lowest gear allowed using the forced downshift shift points and a 2.2 second timer, FRCDWN, is started, and the process repeats.

The electronic transmission shift control automatically shifts gears, yet, by simple operation of a two position toggle switch, switches from an automatic mode to a manual mode.

INDUSTRIAL APPLICABILITY

By monitoring the transmission output speed, the direct drive countershaft transmission is automatically shifted by the transmission controller. With up to fourteen hydraulic implements to control on the motor grader, the operators job is one that makes full use of the hands. The autoshift feature helps reduce the demands on the operator. Part of the autoshift feature is the auto/manual switch which is a two-position rocker switch controlled by the operator. The switch determines whether the transmission is being operated in the manual or the automatic mode. In the manual mode, all shifting is performed by the operator by moving the shift lever. Once in the automatic mode, the transmission controller takes over with the autoshift feature. When switched to the automatic mode, an auto/manual lamp is lit indicating the transmission's automatic mode of operation. The rocker switch also functions as a hold switch. If traction conditions are poor and the operator wants to stay in the present gear, the rocker switch can be toggled to the manual mode. This locks the transmission in its present gear and causes the auto/manual lamp to flash if the shift lever selection and the present transmission do not coincide. Once the operator is out of the poor conditions, the switch can be returned to auto thus resuming the auto shift functions.

Flipping the rocker switch from the automatic to the manual position will result in the auto lamp going out and giving the operator manual control if the shift lever and the present transmission gear coincide. If the auto lamp is flashing, indicating the shift lever selection and the present transmission gear do not coincide, the shift lever must be downshifted until the shift lever selection and transmission gear selection coincide. Once this synchronization is complete, the auto lamp will go out indicating the motor grader is operating fully in the manual mode. The shift lever position controls the maximum obtainable gear while in the automatic mode. If the operator chooses a shift lever position lower than the transmission's present gear in the autoshift mode, the transmission controller will attempt to shift the transmission to the new shift lever position without overspeeding the transmission for more than a predetermined period and that position will become the new maximum obtainable gear.

Another feature incorporated into the automatic mode is a choice of starting gear when leaving neutral. The operator is given a choice of forcing the transmission to start out in a particular gear by moving the shift lever to the appropriate position. The first valid gear code sent from the shift lever to the controller will be the initial gear for starting out greater than GEARTOS. Once a predetermined transmission output speed is reached, the controller will allow downshifts below the starting gear. When stopping in the automatic mode, the transmission gear that was active at the instant the inching pedal was depressed will be the gear in which the machine starts out in (equal to or less than GEARTOS).

As is evident from the foregoing description, certain aspects of the invention are not limited to the particular details of the examples illustrated, and it is therefore contemplated that other modifications and applications will occur to those skilled in the art. For example, the timers may be set for different values than those indicated. It is accordingly intended that the claims shall cover all such modifications and applications as do not depart from the true spirit and scope of the invention.

What is claimed is:

1. A method for controlling shifting of an electronic transmission having an output shaft, a plurality of forward and reverse gears to rotate said output shaft in forward and reverse directions, a neutral gear and an operator controlled shift lever for requesting a gear from said forward, neutral and reverse gears, said method comprising the steps of:

monitoring transmission output shaft speed; operating an auto/manual switch to respective auto and manual positions to select a corresponding one of auto and manual modes of operation for an electronic shift control of the transmission;

operating said shift lever to request a gear from said forward, reverse and neutral gears;

shifting said transmission to said requested gear when said transmission shift control is operating in said manual mode and automatically selecting a present gear on the basis of said transmission shaft output speed when said shift control is operating in said auto mode;

setting the transmission shift control to the manual mode when the requested gear coincides with the present gear and said auto/manual switch is moved to the manual position; and automatically holding said transmission in the present gear, when the auto/manual switch is moved from the auto position to the manual position, until the requested gear coincides with the present gear.

2. A method, as set forth in claim 1, including turning an auto/manual lamp off after setting the transmission shift control to the manual mode when the requested gear coincides with the present gear.

3. A method, as set forth in claim 1, including continuously blinking an auto/manual lamp while holding said transmission in the present gear when the requested gear does not coincide with the present gear.

4. A method, as set forth in claim 1, including shifting said transmission to neutral gear when the auto/manual switch is in the auto position and the shift lever has been moved from one of said forward and reverse gears to the neutral gear.

5. A method for controlling shifting of an electronic transmission, as set forth in claim 1, further comprising:

comparing said monitored speed to a directional shift inhibit speed in response to a directional shift request in said automatic mode; and shifting said transmission to a lowest gear allowed in a current direction of movement when said monitored speed exceeds said directional shift inhibit speed, and otherwise shifting said transmission to a lowest gear allowed in a direction corresponding to said requested gear.

6. A method for controlling shifting of an electronically controlled transmission, said transmission having an output shaft and being electronically shiftable by an electronic shift control between forward and reverse gears to rotate said output shaft in forward and reverse directions and a neutral gear, said transmission having an operator controlled shift lever for requesting a gear from said forward, neutral and reverse gears, said method comprising the steps of:

determining upshift and downshift shift points as functions of the transmission shaft output speed and storing said shift points in a memory;

monitoring transmission output shaft speed;

switching an auto/manual switch to an auto position to operate said shift control in an auto mode;

moving said shift lever from neutral to request a gear from said forward and reverse gears while operating in said auto mode;

determining an appropriate gear using monitored transmission shaft output speed; and automatically shifting said transmission in said auto mode directly from neutral to the requested gear when said shift lever is moved from neutral to request one of second and third gears; and the appropriate gear is lower than the requested gear.

7. A method for controlling shifting of an electronically controlled transmission, as set forth in claim 6, further including:

moving said switch from the auto position to the manual position; and automatically holding said transmission in the present gear in response to the auto/manual switch being moved to the manual position until the requested gear coincides with the present gear.

8. An electronic autoshift control for a transmission having an output shaft and being electronically shiftable between forward and reverse gear to rotate said output shaft in forward and reverse directions and a neutral gear, said electronic autoshift control comprising:

electronic shift control means operable in a manual mode for shifting said transmission between said forward, reverse and neutral gears responsive to operator shift requests, and operable in an automatic mode for shifting said transmission responsive to stored transmission speed shift points;

an operator actuated gear shift lever operable to request a gear from said forward reverse and neutral gears; and a switch operable between a manual position and an automatic position, for selecting between said automatic and said manual modes, said shift control means holding said transmission in the present gear until the gear requested by said shift lever coincides with the present gear when said switch is moved from the automatic position to the manual position and thereafter shifting said transmission responsive to operator shift requests.

9. An autoshift control, as set forth in claim 8, further including:

means for monitoring the speed of said output shaft, said shift control means responding in said automatic mode to a starting gear shift request out of neutral gear to $2^{nd}$ or $3^{rd}$ gear when the monitored output shaft speed does not exceed a forced downshift setpoint, by immediately shifting the requested starting gear.

10. An autoshift control, as set forth in claim 9, wherein said shift control means maintains said requested starting gear until a lower gear is requested or said monitored speed exceeds a predetermined value corresponding to said starting gear.

11. An autoshift control, as set forth in claim 8, further including means for monitoring the speed of said output shaft, said shift control means determining an appropriate gear according to said monitored speed and responding to a starting gear shift request out of neutral gear by immediately shifting to the requested starting gear when said starting gear is not greater than the appropriate gear, and otherwise by immediately shifting to the lowest gear not exceeding a forced downshift setpoint.

12. An autoshift control as set forth in claim 8, further including means for monitoring the speed of said output shaft, said shift control means comparing said monitored speed to a directional shift inhibit speed and responsively shifting said transmission in response to a directional shift request in said automatic mode.

* * * * *